(12) United States Patent
Bhatt et al.

(10) Patent No.: US 8,750,160 B2
(45) Date of Patent: Jun. 10, 2014

(54) METHOD FOR NEIGHBOR SET SELECTION FOR HANDOVER IN A HOME ACCESS ENVIRONMENT

(75) Inventors: Tejas Bhatt, Sunnyvale, CA (US); Shashikant Maheshwari, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 185 days.

(21) Appl. No.: 12/740,065

(22) PCT Filed: Oct. 29, 2007

(86) PCT No.: PCT/US2007/022778
§ 371 (c)(1),
(2), (4) Date: Apr. 27, 2010

(87) PCT Pub. No.: WO2009/058108
PCT Pub. Date: May 7, 2009

(65) Prior Publication Data
US 2010/0260068 A1      Oct. 14, 2010

(51) Int. Cl.
*H04L 12/28* (2006.01)

(52) U.S. Cl.
USPC .......................................................... 370/254

(58) Field of Classification Search
None
See application file for complete search history.

(56) References Cited

U.S. PATENT DOCUMENTS

| | | | |
|---|---|---|---|
| 2004/0141522 A1 | 7/2004 | Texerman et al. | 370/466 |
| 2006/0209773 A1 | 9/2006 | Hundal et al. | |
| 2007/0097938 A1* | 5/2007 | Nylander et al. | 370/338 |
| 2007/0254620 A1* | 11/2007 | Lindqvist et al. | 455/403 |
| 2010/0197311 A1* | 8/2010 | Walldeen et al. | 455/444 |

FOREIGN PATENT DOCUMENTS

| | | |
|---|---|---|
| GB | 2294181 A | 4/1996 |
| WO | WO 99/14974 A1 | 3/1999 |
| WO | WO 01/03459 A1 | 1/2001 |
| WO | WO 2007/040454 A2 | 4/2007 |

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1, IEEE Std 802.16e™-2005 and IEEE Std 802.16™-2004/Corl-2005, Feb. 28, 2006. (1184 pages).

(Continued)

*Primary Examiner* — Dang Ton
*Assistant Examiner* — Ronald H Davis
(74) *Attorney, Agent, or Firm* — Harrington & Smith

(57) ABSTRACT

A macro wireless communication system includes a base station and a femto access point for communicating with user equipment (UE), such as handset, whereby the UE receives information regarding the network relationships between the base station and the femto access point. A home profile setting may be stored in the UE. When the UE communicates with a femto access point that is identified in the home profile, the UE adapts a neighbor listing provided by the home femto access point. Alternatively, the base station stores a list of the UE and its corresponding home femto access point, along with the neighbor list of the femto access point. When a UE is connected to the base station and that base station is in neighbor list of the UE's home femto access point, a message is sent to the UE to forward an appropriate neighbor list to simplify handovers.

16 Claims, 6 Drawing Sheets

(56) References Cited

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Std 802.11™-2007 (Revision of IEEE Std 802.11-1999) Jun. 12, 2007. (864 pages).

NTT Docomo et al.; "Cell ID Assignment for Home Node B"; 3GPP Draft R1-073684; 3GPP TSG RAN WG1 Meeting #50, Athens/Greece, Aug. 20-24, 2007; pp. 1-4, especially p. 1, paragraph 2-p. 3, paragraph 2, figure 3.

\* cited by examiner

METHOD FOR NEIGHBOR SET SELECTION FOR HANDOVER IN A HOME ACCESS ENVIRONMENT

FIELD OF TECHNOLOGY

Embodiments of the present invention relate to wireless telecommunications, and particularly to operation of a femto radio base station of a radio access network to provide access to the wireless network within a building through a local base station.

BACKGROUND OF THE INVENTION

Subscribers use mobile stations to conduct voice communications. Also, data communications, along with other enhanced capabilities of wireless communications systems, are also being provided in these mobile networks. Thus, it has become desirable for many subscribers to be able to use their mobile station as a primary communication device. In many situations, it has not been possible to replace the line-based telephone system in a building because of an inability to achieve sufficient radio frequency communications from inside the building to wireless communication network equipment located outside.

There are RF losses associated with signals trying to penetrate through walls, for example. Concrete, steel, and other building materials block cellular signals, so even when coverage from the macro cell penetrates the building, the signal may be weak or nonexistent in some areas. In many locations, the signal does not have sufficient quality because of conflicting signals from multiple macro cells that happens in cell borders, typically when a handover is initiated, which cause many devices to continually hunt between one source and another. Moreover, macro cells sometimes have capacity limitations due to demand from other users in the area, which can lead to blockages and longer call setup times.

With proliferation of consumer operated IEEE 802.11 wireless data networks, such as Wi-Fi® one option for expanding wireless communication capability is to provide signaling devices within buildings to supplement conventional communications to allow use of a mobile station in a more reliable manner within the building. For example, base station router devices may be used within buildings for interfacing between a mobile station and a wireless communication network so that a subscriber achieves reliable communications within small area.

Femto cell access points are individual radios, essentially small versions of the cellular base stations that provide limited coverage for mobile devices. Femto cells typically have low output power, limited capacity, and are designed for small spaces like apartments or houses. Femto cell products look like Wi-Fi access points and connect to an IP network for backhaul transport. Like the management switch that regulates traffic from the multiple access points in a wireless LAN, femto cell systems manage the flow of traffic out to each cell and back, from the in-building network to the carrier's broader network.

Home or small area WCDMA coverage for limited number of users can be provided using a small radio base station ("RBS"), also called a "femto RBS" and/or a "Home RBS." According to such investigation, the small RBS would provide normal WCDMA coverage for the end users (e.g., to a user equipment unit (UE)), and would be connected to the RNC using some kind of IP based transmission. The coverage area so provided is called a "femto cell" (to indicate that the coverage area is relatively small). Other terminology for a femto cell includes "pico cell" or "micro cell", which is in contrast to a macro cell covered by a macro or standard radio base station (RBS).

One alternative for the IP based transmission is to use Fixed Broadband access (like xDSL, Cable etc.) to connect the home RBS to the RNC. Another alternative would be to use Wireless Broadband access (e.g. HSDPA and Enhanced Uplink; or WiMAX). Two different backhaul alternatives include "xDSL Backhaul" and "WiMAX Backhaul," as described in greater detail below.

A femto RBS is typically installed by the end user rather than the network operator. The end users are also able to move the femto RBS geographically from place to place without the operator being able or willing to control relocation of the femto RBS. Such user-directed relocation requires that, wherever the femto RBS is installed or located, it should connect to the correct RNC.

With a proliferation of such base station router devices, various challenges become apparent. One issue that may arise is false handover where a mobile station is handed over from a serving macrocell to an incorrect base station router device (e.g., a femtocell home unit). A cell may be considered a macrocell, for example, if it is served by a base station and includes other base stations of limited coverage area within the region of the macrocell. Some such devices are referred to as base station router devices that essentially cover a femtocell cell range within a macrocell (e.g., within a building or floor).

With several femtocells within a geographic area, the possibility for false handovers exists. Any attempt to minimize such false handovers should be done with a minimum requirement for processing and signaling to avoid adding burden to the wireless communication system. For example, if a radio resource control layer of the system is required to address false handover situations, additional network signaling and delays in executing correct handovers will be introduced. This becomes especially true when there are large numbers of mobile stations regularly attempting false handovers. Thus, there is a need to minimize or avoid false handovers.

SUMMARY OF THE INVENTION

In embodiments of the present invention, the Macro BTSs do not require transmitting femto APs as their neighbors. In particular, the present invention adapts neighbor notification to assist in the handover of a UE between a Macro BTS and the femto APs.

In one embodiment, a "Home" profile setting is provided for a UE. This setting is created when a user installs femto APs. Since a femto AP is typically targeted for close access to a limited number of users, the user can set-up and define the allowed UEs during the installation procedure. After installation, the femto AP advertises its neighboring macro BTSs that UE monitors. When a mobile user equipment (UE) enters a home access point, as defined under the "Home" profile setting, the UE automatically includes the neighbor list under the "Home" mode. Then, this list is used during handover from femto AP to macro BTS. Likewise, during handover from neighboring macro BTS to femto AP, the UE may identify whether the base-station to which it is connected is a defined neighbor of its home access point. The UE can then include the "Home" access point in its neighbor cell list and monitor the frequency/code of home base-station. Likewise, the UE can automatically, by default, add the Home femto AP a current neighbor list. When a femto AP and/or macro BTS is included in the neighbor list, the UE will seek out those stations and attempt to connect, depending on various known connection factors such as signal strength.

In one implementation, a femto AP may receive information about its macro neighbor during installation from service provider's network via a femto gateway. The service provider may have information on the geographic location of the femto AP. Alternatively, the service provider does not need to know about exact location of femto CPE, but instead, sends the neighbors list based on a network address/ID of the femto AP/gateway or the overlying Macro BTS. The femto AP can then broadcast and transfer the neighbor list to the UE that, then, authenticates the neighbor list.

In one embodiment, the femto AP includes a Downlink (DL) searcher to acquire knowledge about its neighbors. (pls replace DL searcher with something more generic like "specialized circuitry") The DL searcher is useful because the femto AP can use this DL searcher to identify, for example, a scrambling code to be used in a DL operation to allow dynamic scrambling code planning based on neighbor femto search, particularly, if the femto AP and the macro network each operates on a different frequency and that all co-located femto APs operate in same frequency band. Further macro base station and femto APs may operate on same frequency band.

In this embodiment, the implementation of the UE related to handover and how UE stores and updates neighbor list is modified. In particular, the newly defined "Home" profile stores a home access point and neighbors of that home access point. Then, the home access point should appear as a choice when UE is connected to any of neighbors of the home access point. To enable this function, the handover procedure in the UE includes the "Home" profile correlation whenever the UE searches for neighboring BTS.

In another embodiment, upon installation and authentication of home access point, authenticated UEs and their corresponding home access point are registered in an operator's database, along with the neighbor list of the femto AP. When a UE is connected to one of the macro BTS that is in neighbor list of its femto access point, the network initiates and transmits a unique unicast neighbor advertisement message for the UE. The message directs the UE to add the UE's home femto AP in its current neighbor list. In this way, the UE is NOT continuously searching for its home femto AP when connected to any macro BS, but only when either it is instructed by the radio network via macro base-station or when it identifies that it is under the coverage of macro base-station that overlays its own femto access point or when it identifies that it is under the coverage of one of the macro base-station which is listed in the neighbor list of femto AP.

Consequently, the Macro BTS does not typically include or identify the femto APs in a broadcast neighbors list. Accordingly, embodiments of the present invention provide simple solutions to enable handover between femto APs and macro BTSs without requiring base-station to broadcast private femto CPE information to all the UEs in the cell.

The proposed invention is also useful for UE's to reduce the neighbor search and save power, as the UE searches for the femto access points only when signaled by macro network or only when it identifies the macro base-station that overlays its own femto access point, as this information is set during the "Home" profile initialization. It allows macro network operator to avoid broadcasting private femto access point information to the UEs that are not allowed to access the particular femto access point.

BRIEF DESCRIPTION OF THE DRAWINGS

The above and other objects, features and advantages of certain exemplary embodiments of the present invention will be more apparent from the following detailed description taken in conjunction with the accompanying drawings in which.

DETAILED DESCRIPTION OF THE PREFERRED EMBODIMENTS

As an initial matter, the following abbreviations are defined to aide in the clarity of the following disclosure.
AP—Access Point
BS—Base Station
CPE—Customer Premise Equipment HNB—Home Node B
MS—Mobile Station
DL—Downlink
UL—Uplink
UE—User Equipment As previously introduced, a Home Access Point (HAP), which is also known as a femto base station (BTS), Home Node B (HNB), femto customer premises equipment (CPE), or a femto access point (AP), extends reliable high data-rate wireless access inside home and office environments. A main concept is to extend voice coverage and to provide wireless broadband access to a limited number of users using a small access point (BS). With increasing demand of broadband and wireless broadband traffic (e.g. multimedia, video) over Internet, home and office users are fast becoming important target customers for wireless operators and solution providers. One advantage for the femto AP is that UE (User Equipment) only needs to support one radio and that femto AP enables easy intra-system handover between femto and macro BTS.

Figure 1:
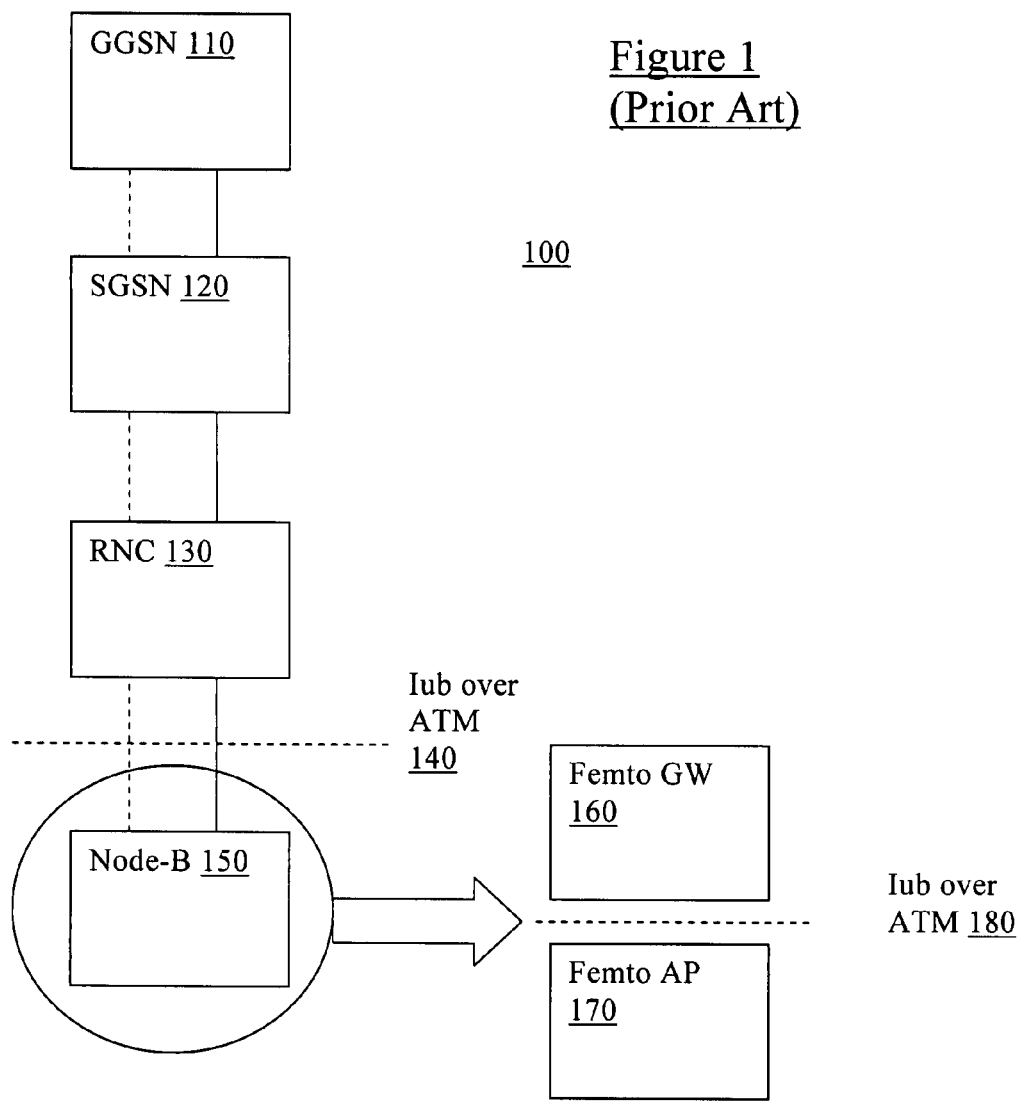
FIGS. 1-3 (PRIOR ART) depicts known exemplary femto cells configurations.

The overall system architecture, in accordance with embodiments of the present invention, may vary with different deployment scenario of femto CPE. Referring now to FIG. 1 (PRIOR ART), a first femto system 100 is implemented using a legacy 3rd Generation Partnership Project (3GPP®) system. In this implementation of the femto system 100 in a legacy 3GPP system, the femto CPE is essentially a simplified node-B with IP backbone. The IP backhaul 180 could be over DSL, Cable (Ethernet) or Fiber. The femto AP 170 is then connected to a femto gateway 160, which typically serves multiple femto APs. The Femto GW 160 terminates an Iub interface 140 from the RNC 130 and should provide ATM to IP conversion if the Iub 140 over RNC is over ATM.

The femto system 100 includes a Gateway GPRS Support Node (GGSN) 110 and a Serving GPRS Support Node (SGSN) 120 that supports the use of GPRS or other IP packet transmitting protocol in a mobile network (GSM is pure circuit switched, so deleted 'such as GSM'). The GGSN 110 acts as an interface between the GPRS backbone network and the external packet data networks (radio network and the IP network). This component converts the GPRS packets coming from the SGSN 120 into the appropriate packet data protocol (PDP) format (e.g. IP or X.25) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN 120 address of the user and the user's profile in a location register. The GGSN 110 is responsible for IP address assignment and is the default router for the connected UE. The GGSN 110 also performs authentication and charging functions. In this way, the GGSN is the anchor point that enables the mobility of the user terminal in the GPRS/UMTS networks. It maintains routing necessary to tunnel the Protocol Data Units (PDUs) to the SGSN that service a particular MS (Mobile Subscriber).

Continuing with FIG. 1, the SGSN 120 is generally responsible for the delivery of data packets from and to the mobile stations within its geographical service area. The tasks of the SGSN 120 include packet routing and transfer, mobility management (attach/detach and location management), logical link management, and authentication and charging functions. A location register of the SGSN 120 stores location information, e.g., current cell, current Visitor Location Register (VLR) and user profiles, e.g., International Mobile Subscriber Identity (IMSI), addresses used in the packet data network, etc. of all GPRS users registered with this SGSN.

Continuing with FIG. 1, the Radio Network Controller (RNC) 130 is the governing element in the UMTS radio access network (UTRAN) responsible for control of the Node-Bs 150, the base stations that are connected to the controller 130. The RNC 130 carries out radio resource management, mobility management functions and encrypts/decrypts data is sent to and from the mobile device. The RNC 130 typically connects to the SGSN 120 in a Packet Switched Core Network.

As depicted in FIG. 1, the RNC 130 connects over the Iub over IP 140 to the Node B 150. The Node-B 150, also known as the BTS (base transceiver station), typically contains radio frequency transmitter(s) and the receiver(s) used to communicate directly with the mobiles In a second known femto system 200 depicted in FIG. 2 (PRIOR ART), an Enode-B 230 includes a femto GW 250 that is connected directly through a IP backbone 220 to the access gateway (aGW) 210 that provides access to external SGSN/GGSN (not depicted). In this example, the functionality of the RNC 240*b* is embedded within the femto CPE 260, while the femto gateway may provide RNC interface 240*a* to macro radio network element 210 (access gateway). The RNC functionality may further be simplified and divided between the femto GW 250 and the femto CPE 260 that are connected by the Iu over IP 270.

Figure 3:
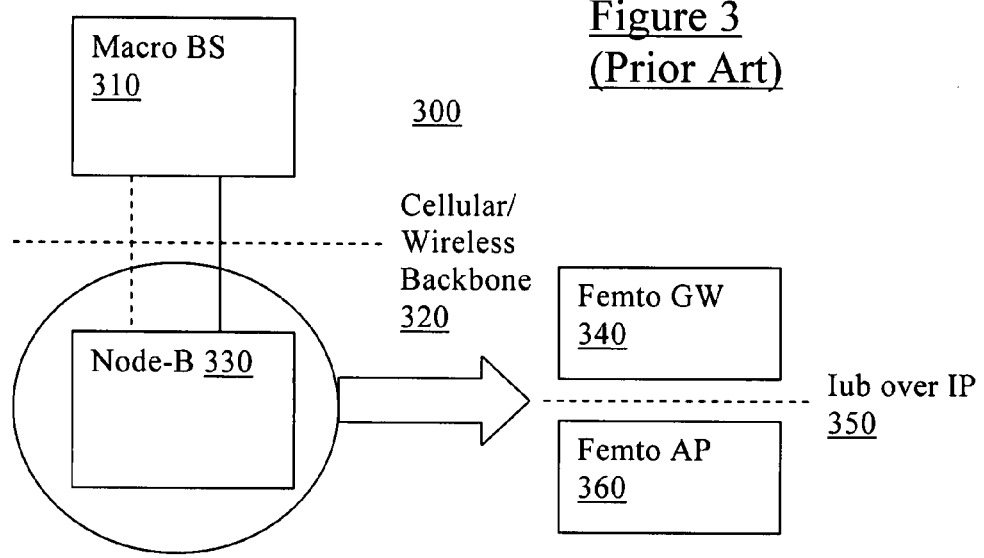

In another known femtocell configuration depicted in FIG. 3 (PRIOR ART), a third known femto system 300 includes a femto CPE 360 that is connected by Iub over IP 350 to the femto GW 340. The femto CPE 360 is connected as a macro BS via a cellular wireless backhaul such as mobile WiMAX (802.16e). In this way, the femto CPE 360 in effect acts as a relay node.

Figure 4:
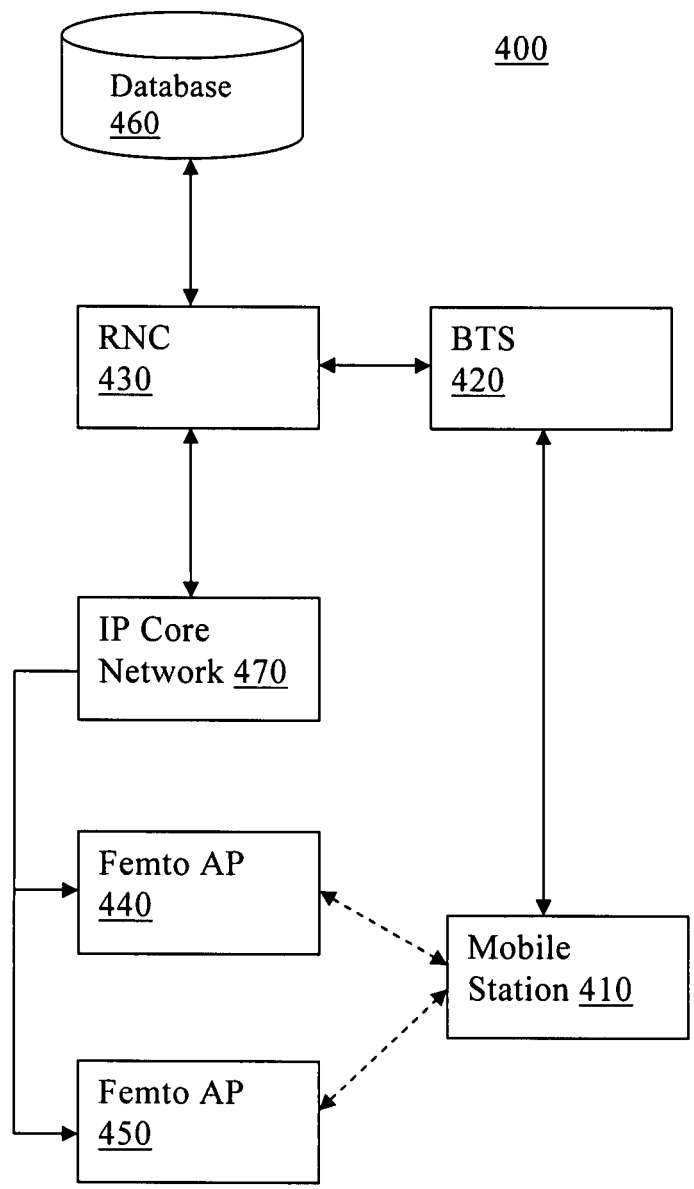
FIG. 4 (PRIOR ART) depicts the configuration of a known exemplary radio communication network that includes femto cells.

Referring now to FIG. 4, an implementation of a macrocell communication system 400 having femtocells is schematically depicted. In this example, a mobile station 410 is communicating with a base station (BTS) 420. A controller 430, which in the illustrated example comprises a radio network controller (RNC), facilitates communications on behalf of the base station 420 and the mobile station 410 in a known manner. The BTS 420 and the controller 430 enable a radio access network (RAN) that covers a geographical area which is divided into cell areas, with each cell area being served by a base station 420. A cell is a geographical area where radio coverage is provided by the radio base station equipment at a base station site 420. Each cell is identified by a unique identity that is broadcast in the cell to all UE 410 within the cell, and the base stations 420 communicate over the air interface with the user equipment units (UE) within range of the base stations.

Although not depicted in FIG. 4, the macro-network 400 may include multiple base stations 420 that connected (e.g., by landlines or microwave) to the RNC 430. The radio network controller 430, also sometimes referred to as a base station controller (BSC), supervises and coordinates various activities of the plural base stations connected thereto. One example of a RAN 430 is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is a radio access network providing wideband code division multiple access (WCDMA) to user equipment units (UEs). The Third Generation Partnership Project (3GPP) has undertaken to evolve further the UTRAN and GSM-based radio access network technologies.

In WCDMA technology, a common frequency band allows simultaneous communication between the user equipment unit (UE) 410 and base stations 420. Signals occupying the common frequency band are discriminated at the receiving station 420 through spread spectrum CDMA waveform properties based on the use of a high speed, pseudo-noise (PN) code. These high speed PN codes are used to modulate signals transmitted from the base stations and the user equipment units (UEs) 410. Transmitter stations using different PN codes (or a PN code offset in time) produce signals that can be separately demodulated at a receiving station. The high speed PN modulation also allows the receiving station 420 to advantageously generate a received signal from a single transmitting station by combining several distinct propagation paths of the transmitted signal. In CDMA, therefore, a user equipment unit (UE) 410 need not switch frequency when handover of a connection is made from one RAN cell to another. As a result, a destination cell can support a connection to the UE 410 at the same time the origination cell continues to service the connection. Since the UE 410 continuously communicates to at least one cell during handover, there is no disruption to the call. In contrast to hard handover in which one type of communications to a device cease and a second type of communications is established, soft handover is a switching operation in which the existing connection is maintained until a new connection is established to allow communications to continue without minimal interruptions.

Other types of telecommunications systems which encompass radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the U.S. Digital Cellular (USDC) system; and the code division multiple access (CDMA) system described in EIA/TIA IS-95.

Interfaces of interest include the interface between the radio network controllers (RNC) 430 and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". An interface between radio network controllers, is termed the "Iur" interface.

The radio network controller (RNC) 430 controls, for example, the downlink (DL) power transmitted by the base stations; the uplink (UL) interference perceived by the base stations; and the hardware situated at the base stations.

In certain RAN-UE connections, an RNC 430 can either have the role of a serving RNC (SRNC) or the role of a drift RNC (DRNC).

If an RNC 430 is a serving RNC (SRNC) connected to the core network, the RNC is in charge of the connection with the user equipment unit (UE), e.g., it has full control of the connection within the radio access network (RAN). Otherwise, a drift RNC (DRNC) supports the serving RNC (SRNC) by supplying radio resources within the cells controlled by the drift RNC (DRNC) as needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. The CRNC role is not UE specific and has responsibilities that include handling radio resource management for the cells in the base stations connected to it by the Iub interface.

Returning to FIG. 4, as the mobile station 410 approaching a first femto AP 440, the macro communications system 400 needed to prepare for a handoff of the MS 410 from the BTS 420 and the femto AP 440. As described above, the femto AP 440 is typically an in-home router device to facilitate using the mobile station 410 from within the corresponding building. Examples of the femto AP 440 includes home-unit base stations or home gateway base stations. As the mobile station 410 approaches the femto AP 440, the mobile station 410 ideally would hand over from communicating directly with the BTS 420 to communicating directly with the femto AP 440. Handover processes are known and such a handover can include known techniques. Typically, the handoff is initiated by the MS 410 when the MS 410 detects the signal from the femto AP 440 is stronger than the signal from the BTS 420.

In the illustrated example, another femto AP 450 is located geographically nearby the first femto AP 440. In one example, the second femto AP 450 is inside of a neighboring home close by the home of the mobile subscriber who owns the first femto AP 440. In typical situations, the UE cannot access the second femto AP 450 without some type of prior established arrangement because each of the femto APs 440 and 450 are typically separately administered and controlled. The technical implications of this separate control are described in greater detail below.

Continuing with FIG. 4, the composite network 400 often includes a database 460 in which the RNC 430 stores information regarding any femto APs that are within the geographic region corresponding controlled by the RNC 430. The database 460 may include, for example, information regarding the location of each such femto AP. The location information may be information such as address, postal code, subscriber ID or other recognized information that provides location information. Alternatively, as described below, the database 460 may store network locations of the femto APs 440, 450.

As described above in FIGS. 1-3, the radio network controller 430 is typically connected to one or more core networks. Thus, the core network may have multiple service domains, with an RNC 430 having an interface to each of the domains. The example of FIG. 4 includes an IP core network 470, similar to the configuration of FIG. 1, through which the controller 430 communicates directly with the femto APs 440 and 450. The IP core network 470 in one example is used for managing the femto APs 440 and 450.

Figure 2:
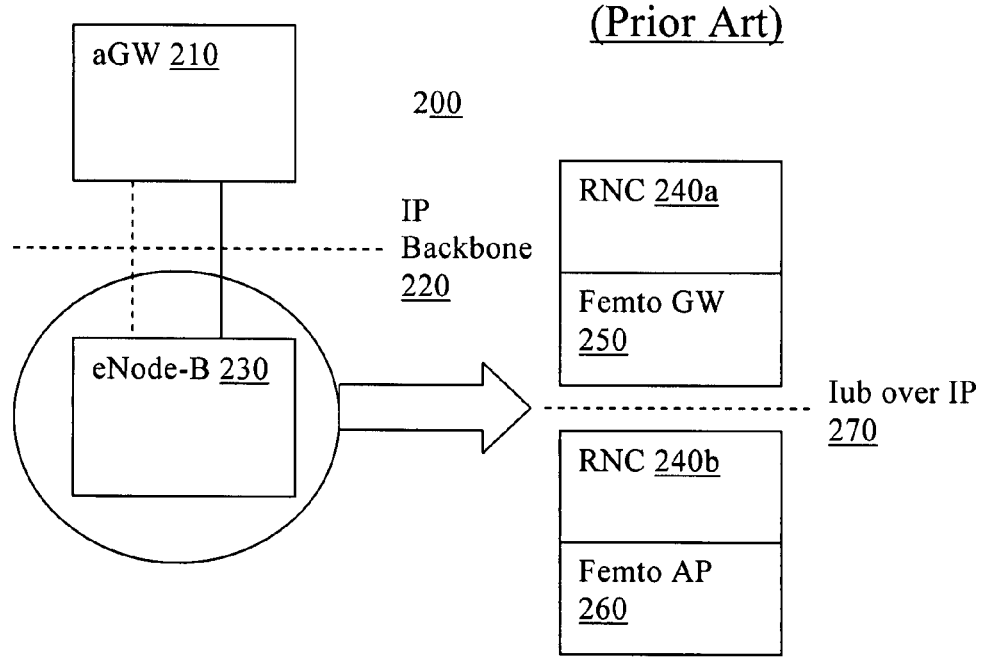

In the known femtocells networks 100, 200, 300 of FIGS. 1-3, the femto cells 100, 200, 300 typically compete with wireless data access since the femto access is provided through the wireless data modem. In particular, in most typical cases, femto APs 440, 450 are deployed in a licensed band from an operator that is separate from the band of macro BS 420. Also, due to limited spectrum availability, femto APs 440, 450 typically work with frequency reuse of 1, so that at any time, a separate frequency is used for each transmissions in the femtocell. As described above, one requirement for femto AP is to support handovers between the BS 420 and the femto AP 440, 450 to allow seamless mobility support.

Referring again to FIG. 4, in most cellular system supporting full mobility, a base-station 420 transmits to the local UE 410 a set of neighbors in order to allow the UE 410 to monitor and/or initiate handover. The neighbor advertisement messages are typically broadcast over common radio or data transport channel that is monitored by all the UE 410 in the base-station's coverage area. For example, the neighbor set for a base station 420 may include data on another BST 420, so that the UE 410 can search for and switch to the other BST 420, when appropriate. However, the femto AP 440, 450 provides closed access to a few UEs 410 (e.g., members of a family at home, employees of a small office, etc.) Thus, the macro BTS 420 usually does not add the femto APs 440, 450 as "neighbors" and, thus, usually does not broadcast the availability of the femto APs 440, 450 to the UE 410. Moreover, there may be hundreds or thousands of femto AP 440, 450 in a cell served by one macro BTS 420. The numbers of neighbors that a macro BTS 420 can transmit is limited by most standards. For example, in the 3GPP® standard, a macro BTSs 420 can broadcast only up to thirty-two neighbor cells. Thus, problems may arise in handover support between macro BTS 420 and a femto AP 440.

To address these and other needs, embodiments of the present invention adapt the known femto cells 100, 200, 300 to enable a Macro BTS 420 that does not need to transmit femto APs 440, 450 as "neighbors," but still assists in the handover of UE between a Macro BTS 420 and the femto APs 440, 450.

Figure 6:
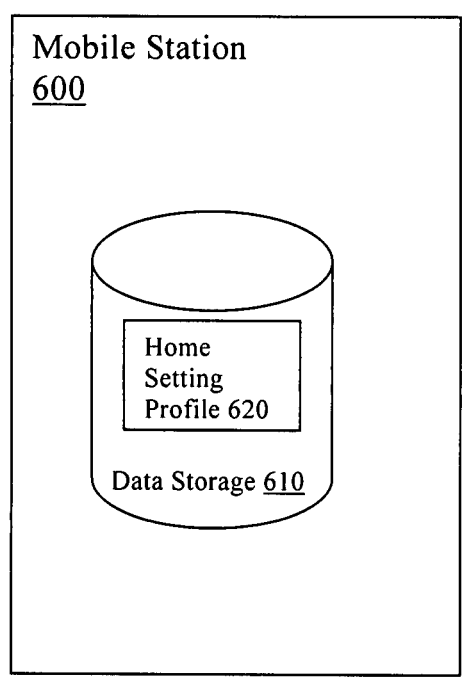
FIG. 6 is a schematic depiction of a modified mobile station in accordance with embodiments of the present invention.

In one embodiment depicted in FIG. 6, a mobile station 600 is adapted to include a storage device 610 that stores a "home" setting profile 620. The home profile setting 620 may be provided for any UE 410 in the composite communications network 400. Typically, this home setting 620 may be created when a user installs or modifies the femto APs 440, 450. Since the femto APs 440, 450 are targeted for closed access to a limited number of UE 410, the user can set-up and define the allowed UE 410 during the installation procedure. The user enters home femto AP 440, 450 under "Home" profile setting and UE 410 automatically includes the home femto AP 440, 450 in the neighbor list under the "Home" profile. The MS 600 may be implemented in different fashions depending on the particular handover protocol with the macro communications system 400 and on how MS 600 stores and updates neighbor list. Preferably, the "Home" profile stores one or more home femto APs 440, 450 and the BTS 420 as neighbors. Typically, the Home femto AP 440 or 450 appears as a connection option for the user when the MS 600 is connected to any neighbors of the home femto APs 440, 450. To enable this functionality, the MS 600, during handover procedure, may perform a "Home" profile correlation whenever searching for neighboring BTSs 420, as described below.

The application of the home setting profile 620 in the UE 600 is now described with reference to FIG. 5 that depicts a status flow 500 that summarizes interactions between a base station (BTS) 510, a femto AP 520, and a mobile user equipment (UE) 530. During the installation process, the femto AP 520 receives communications 540 to identify the neighboring BTS 510. The femto AP 520 may receive information about neighboring macro BTSs 510 during installation from a service provider's network via a femto gateway, such as the IP core network 470. The service provider may return neighbor data based upon the physical locations of the BTS 510 and the femto AP 520. Alternatively, the service provider does not need to know about exact location of femto AP 520 but instead sends the neighbors list based on network addresses or identifiers of the femto APs 520 and/or the overlaying Macro BTS 510. Optionally, the femto AP may then also authenticate the BTS neighbor list 540.

Figure 5:
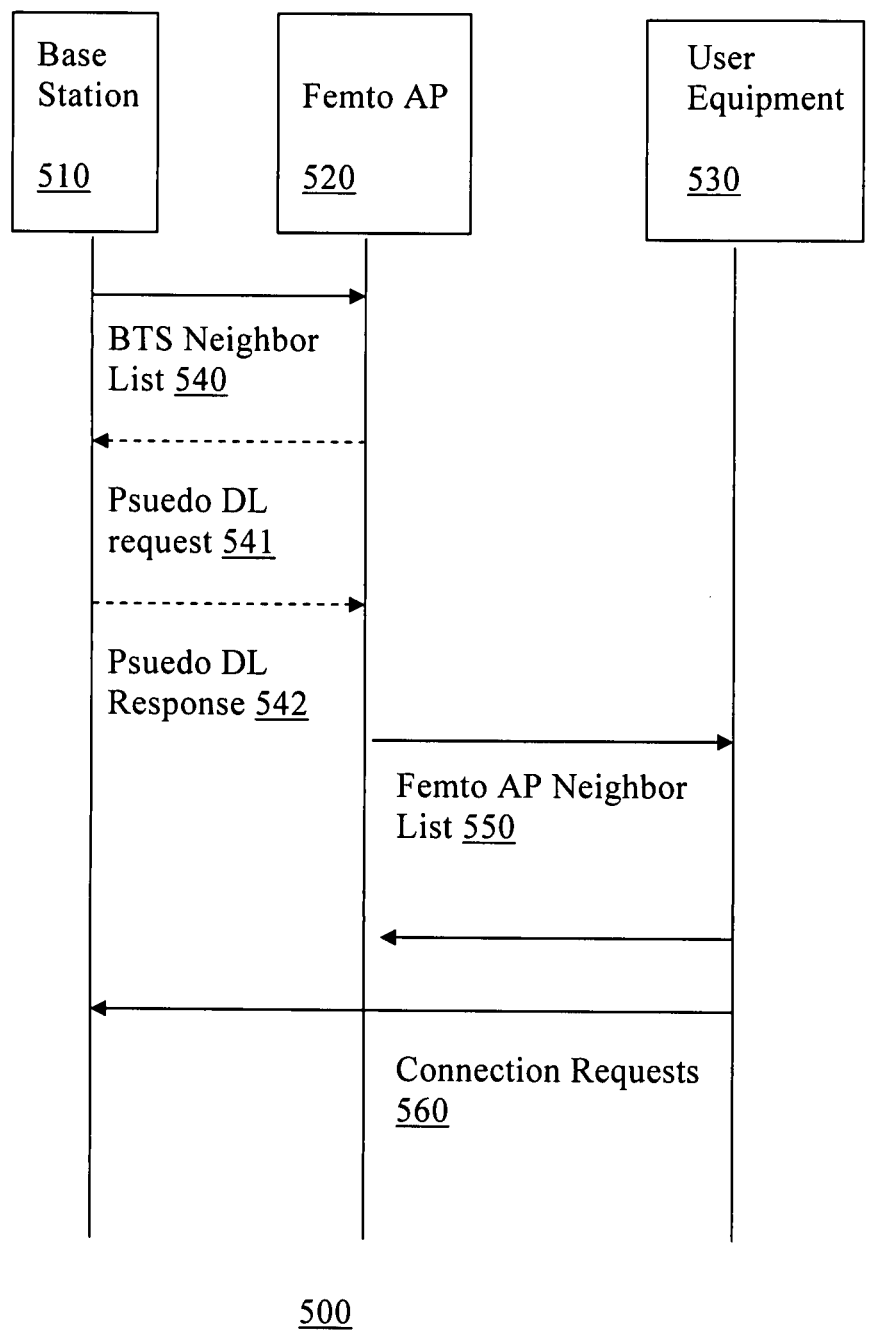
FIG. 5 depicts a process flow diagram that discloses the operation of a femtocell network in accordance with embodiments of the present invention.

Continuing with FIG. 5, the femto AP 520 may optionally include a download (DL) BTS searcher to acquire knowledge about its neighbors, such as near BTS 510 or other femto APs 520. In particular, the femto AP 520 can effectively ping the BTS 510 by optionally transmitting a DL request 541 through the femto gateway. The femto AP then waits for a BTS 510 to respond to the DL request, through optional DL response communications 542. In this way, the femto AP 520 can use a DL search messages 541, 542 to identify a scrambling code that the femto AP 520 should use in a DL operation because the RNC 430 will direct a scrambling code that does not interfere to other communications between the BTS 510, the femto AP 520, and the UE 530. Similarly, the DL request process allows the femto AP 520 to perform dynamic scrambling code planning based on neighbor femto search for similar reasons. Typically, the femto 520 and the macro BTS 510 operate on different frequencies, whereas all co-located femto APs 520 operate in a substantially similar frequency band.

Continuing with FIG. 5, the femto AP transmits to a UE 530 a neighbor list 550 that identifies neighboring macro BTSs 510. As described above, the home femto AP 520 is identified in the "Home" profile setting. The UE 530 may then automatically update include its neighbor list under the "Home" mode to include neighbors associated with the home femto AP 520. In communication 560, this neighbor list is used by the UE 530 during a handover from femto AP 520 to macro BTS 510. Alternatively, in communication 560 during handover from the neighboring macro BTS 510 to a femto AP 520, the UE 530 may identify whether the macro BTS 510 to which the UE 530 is connected is one of the neighbors of the home femto AP 520. The UE 530 then includes the home femto AP 520 in the UE's neighbor cell list and monitors the frequency and/or code of the home femto AP 520. Alternatively, by default, the home femto AP 520 may always be present in the current neighbor list of the UE 530.

Figure 7:
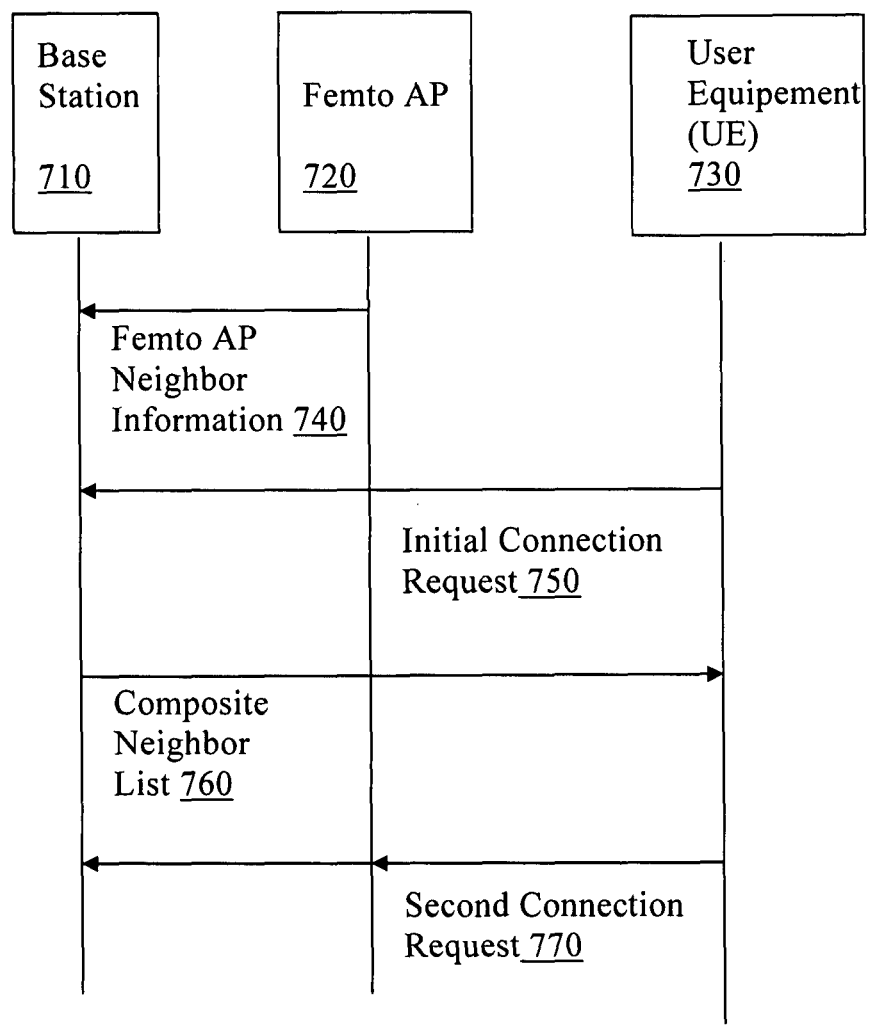
FIG. 7 depicts a process flow diagram that discloses the operation of a femtocell network in accordance with another embodiment of the present invention.

In another embodiment depicted in FIG. 7, a status flow 700 summarizes interactions between a base station (BTS) 710, a femto AP 720, and a mobile user equipment (UE) 730. Upon installation and authentication of a femto AP 720, the femto AP 720 forwards a communication 740 to the BTS 710 to identify authenticated UEs 730 and their corresponding home femto APs 720. The listing of the authenticated UEs 730 and their corresponding home femto APs 720 are registered in an operator's database, such as database 460 described above. Likewise, a neighbor list of the femto AP 720 may also be included in the communication 740. After a UE 730 connects to a BTS 710 through communication 750, the BTS 710 searches its database 460 to determine whether that BTS 710 is in the neighbor list for the home femto AP 720 for the UE 730. If that BTS 710 is in the neighbor list for the home femto AP 720 for the UE 730, the BTS 710 responds with a unicast, unique message to the UE 730 in communications 760. The communications 760, typically a data packet containing a header that uniquely identifies the UE 730 through a connection index (CID), includes a request to add the UE 730 home femto AP 720 to the current neighbor list of the UE 730. Thus, during subsequent connection requests 770, the UE 730 monitors the frequency and/or code of the home femto AP 720.

In this way, embodiments of the present invention provide simple solutions to enable handover between femto APs 440, 450 and macro BTSs 420. The macro BTS does not require to transmit femto APs as its neighbors and still can perform handover through changes are required in UE implementation and/or standards.

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed is:

1. A method comprising:
   creating, by a user equipment, a home profile;
   adding, by the user equipment at least one network device in the home profile;
   receiving, by the user equipment, an access point neighbor list from an access point, wherein said access point neighbor list is configured to identify at least one network device associated with the access point;
   determining, by the user equipment, whether the access point is identified in the home profile; and
   based on the access point being identified in the home profile, updating a neighbor list of the home profile to include the at least one network device.

2. A method of claim 1, wherein the at least one network device comprises at least one of a base station and another access point associated with the access point.

3. The method of claim 2, wherein the access point neighbor list identifies the base station through a unique base station signature such as scrambling code, preamble, pilot pattern or training sequence.

4. The method of claim 2, wherein the user equipment communicates with the access point and the base station in different frequency bands.

5. The method of claim 1, wherein the at least one network device comprises a base station, and the method further comprising:
   monitoring the base station.

6. The method of claim 1, wherein the at least one network device comprises another access point, and the method further comprising searching for and monitoring the another access point.

7. The method of claim 1, further comprising updating the home profile to include the access point neighbor list.

8. A device comprising:
   a processor; and
   a memory including program code, where the memory and the program code are configured to cause the processor to at least:
   instruct storing a home profile;
   instruct adding at least one access point in the home profile;
   instruct receiving an access point neighbor list from an access point, wherein said access point neighbor list identifies at least one network device associated with the access point, instruct determining whether the access point is identified in the home profile; and based on the access point being identified in the home profile, instruct updating a neighbor list of the home profile to include the at least one network device.

9. The device of claim 8, wherein the at least one network device comprises at least one of a base station and another access point associated with the access point.

10. The device of claim 8, wherein the at least one network device comprises a base station, and wherein the processor is further caused to:

instruct searching for and monitoring the base station.

11. The device of claim 10, wherein the memory including the program code is configured to cause the processor to instruct communicating with the access point and the base station in different frequency bands.

12. The device of claim 8, wherein the at least one network device comprises another access point, and wherein the processor is further caused to:

instruct searching for and monitoring the another access point.

13. A mobile device comprising:

a processor; and a memory including program code, where the memory and the program code are configured, to cause the processor to at least:

instruct connecting to a first base station;

instruct receiving a message from the first base station, said message comprising a neighbor list that comprises an identifier that specifies an access point, wherein the message is uniquely addressed to the mobile device instruct determining whether the first base station is identified in a home profile associated with the mobile device; and based on the access point being identified in the home profile, instruct updating a neighbor list of the home profile to include the identifier that specifies the access point.

14. The mobile device of claim 13, wherein the memory including the program code is configured to cause the processor to: instruct searching for and communicating with the access point.

15. The mobile device of claim 13 wherein:

the said access point identifier is received from network based on presence of the mobile device in a coverage area of the first base station.

16. The mobile device of claim 13, wherein the memory including the program code is configured to cause the processor to: instruct communicating with the access point and the first base station in different frequency bands.

* * * * *